Patented Feb. 17, 1942

2,273,650

UNITED STATES PATENT OFFICE 2,273,650

COMPOSITIONS OF MATTER

Charles E. Linebarger, Jr., Chicago, Ill., and Charles E. Linebarger, deceased, late of Chicago, Ill., by Charles E. Linebarger, Jr., administrator, Chicago, Ill., assignor to The Chaslyn Company, Chicago, Ill., a corporation of Illinois No Drawing. Original application August 14, 1935, Serial No. 36,214. Divided and this application July 30, 1938, Serial No. 222,220

4 Claims. (Cl. 106—243)

This invention relates to new compositions of matter for use in the arts, and particularly for the manufacturing of hydrometric units employed as means of indicating the specific gravity or density of liquids. This specification is a division of the specification of an application for patent filed by us on August 14, 1935, and known in the Patent Office as Serial No. 36,214 which issued as Patent No. 2,133,300, on October 18, 1938; and reference may be had to that application and patent for many descriptions and details which are not included in this present application.

One of the objects of this invention is the production of a solid composition that is insoluble in water and inert to aqueous solutions of acids, bases and salts of medium strength and not having powerful oxidizing properties, as well as alcohols, glycerine, glycol and similar substances, and compositions for various purposes that can be used for articles which in use come in contact with such liquids. The nature of our new compositions of matter is such that they can be melted into homogeneous liquids and then may be cast into molds to form homogeneous solids. Further they are designed for the making of homogeneous hydrometric units known to the trade as Chaslyn balls, tablets, discs or cartridges, which, when placed in a liquid, will swim or sink accordingly as the densities of the liquids are greater or less than that of the units.

In connection with the main ingredients of the compositions, for various corrective purposes, we use any gum-like substances of the nature of latex, chicle, artificial rubber (Duprene), chlorinated rubber (Tornesit), gutta percha, and any synthetic resin like Bakelite, and the like, provided that they are compatible and impart desirable qualities to the composition. By the word "compatible" herein we mean that the substances have complete mutual solubility with absence of chemical action.

We now describe the general method of preparing our compositions of matter, using synthetic compounds suitable for hydrometric units, selecting materials for that purpose which are typical and illustrative of the process. However, the examples given are not to be construed as limiting our application in any way, such as in the materials and the proportions thereof stated.

The heavy component selected is about 50% chlorinated naphthalene known to the trade as Halowax, the density of which is 1.53 to 1.59, flow point 196° to 205° F.; and the light component is hydrogenated castor oil, commercially available under the trade names Opalwax or Rilan wax, specific gravity or density 0.98 to 1.0, flow point 171° to 178° F. Equal weights of these two components are melted together; the molten mixture is well stirred to insure perfect homogeneity, and it is then poured into suitable molds. The density of the resulting casting is 1.214 to 1.219 at 70°, and the flow point is 165° to 174° F.

An inspection of this binary blend showed that it was lacking in cohesive strength and did not possess sufficient shrinkage. To remedy these deficiencies we added to it 4.3% of meta-dinitrobenzene and 9.1% of stearyl alcohol, known to the trade as Stenol. Castings of this quaternary composition had a density of 1.2050 to 1.2065 at 70°; and it showed other desirable characteristics such as rendered it well adapted for the manufacture of hydrometric units. Blends consisting of the four materials cited, in proportions as follows are suitable: Halowax 43.3%, dinitrobenzene 4.3%, and stearyl alcohol 9.1% and Opalwax 43.3%. Such blends will have a density of a little over 1.2, the varying densities of the commercial ingredients being responsible for slight fluctuations in the density of the components.

The density correcting substance does not need to be one of the components of the composition, a substance known to produce the desired improvement can be used, if it is desired to improve certain qualities in a composition, providing the density of the substance is appropriate, a twofold advantage being gained thereby.

Certain pairs of compounds, as, for example, Halowax and Opalwax, and Halowax and stearyl alcohol, can form hydrometric compositions when combined in any proportion, the range of densities being from that of the one compound to that of the other. The quality of such compositions, however, varies with the proportions and usually needs to be improved through the addition of corrective components.

If certain hydrometric compositions have desirable properties that may be spoiled by the addition of soluble density correcting components, we apply as substitutes inert and insoluble powders in such a finely divided state that their particles remain in suspension in the composition and do not, on solidification, materially affect the homogeneity. Suitable powders are barium sulphate, precipitated silica, and the like.

We have found that the hardness of a composition is increased by incorporating therein small proportions of dinitrobenzene or acetanilide, or benzoic acid, or similar substances belonging to the same chemical classes, respectively. The shrinkage is affected by the use of carnauba wax, or stearyl alcohol, or similar carbon compounds. The strength is affected by the use of naphthalene, or diphenylamine, or the like. The grain or texture is improved by adding petroleum hydrocarbons of high carbon content, or those melting above 130° F., or montan wax, or anthraquinone, or phenanthrene, or diphenyl, or similar organic compounds belonging to their respective classes. Fusibility is affected, by adding one or more of the substances anthracene, benzamide, or the like. In each case these should be added in proportions of less than ten per cent.

Inasmuch as hydrometric units known to the trade as Chaslyn units, balls, tablets or discs are extensively used as charge indicators in storage batteries and accumulators, and inasmuch as the range of the densities of the sulphuric acid adopted in storage batteries in practice is 1.1 to 1.3 we have experimented extensively with mixtures of two synthetic waxes, which we refer to as the heavy and the light component, together with one or more carbon compounds, which we designate as corrective components, in order to ascertain what properties these substances must have in order to produce acceptable hydrometric units for batteries, and we have learned that any combinations of synthetic waxes of different densities that are compatible and that will fuse together to form a true solution in which are freely soluble such carbon compounds as improve the quality and change the density of the whole mixture, so that castings may be made from it having densities ranging from 1.1 to 1.3, are adapted for manufacturing Chaslyn balls or units, provided that the mixture is inert to sulphuric acid of the same range of densities.

Our compositions are also adapted for making hydrometric units capable of testing the density of liquids used to lower the freezing point of solutions placed in automobile radiators. By employing in large measure components which, like hydrogenated castor oil, are but slightly soluble in alcohols, glycol, glycerine and other constituents of gasoline engine radiator liquids, the hydrometric units made from our compositions are not appreciably affected by any solvent action of the freezing preventatives and anti-freeze mixtures.

The foregoing descriptions and illustrations are not intended to impose any limits as to the scope and range of equivalency of the method, formula, or components set forth, or to their proportions. The names of compositions given are to be understood as standing as representatives for broad classes of chemical materials and are not to be understood as limiting in any way the present invention to the components mentioned.

We claim as our invention:

1. A composition of matter comprising 20 to 80 parts of hydrogenated castor oil dissolved in 80 to 20 parts of melted chlorinated naphthalene, to which is added meta-dinitrobenzene in proportion of less than 10 percent, and including not more than 10 percent benzoic acid.

2. A composition of matter as claimed in claim 1, including not more than 10 percent naphthalene.

3. A composition of matter as claimed in claim 1, including not more than 10 percent phenanthrene.

4. A composition of matter as claimed in claim 1, including not more than 10 percent anthracene.

CHARLES E. LINEBARGER, Jr.
CHARLES E. LINEBARGER, Jr.,
*Administrator of the Estate of Charles E. Linebarger, Deceased.*